May 16, 1967 R. H. CUNNINGHAM 3,320,402

METHOD AND APPARATUS FOR FUSION WELDING

Original Filed Feb. 10, 1964

INVENTOR
RAE H. CUNNINGHAM

BY *Shoemaker and Mattare*

ATTORNEYS ent Office 3,320,402
Patented May 16, 1967

3,320,402
METHOD AND APPARATUS FOR FUSION WELDING
Rae H. Cunningham, Newport News, Va., assignor to Newport News Shipbuilding and Dry Dock Company, Newport News, Va., a corporation of Virginia
Continuation of abandoned application Ser. No. 343,825, Feb. 10, 1964. This application Sept. 9, 1966, Ser. No. 578,410
2 Claims. (Cl. 219—137)

The present application is a continuation of U.S. patent application Ser. No. 343,825, filed Feb. 10, 1964, now abandoned.

The present invention relates to new and novel method and apparatus for fusion welding, and more particularly to such a process employing fine particles of a metallic substance for controlling the fusion welding process.

The present invention is concerned with fusion welding processes in general, and has particular utility in a submerged arc-type welding process wherein "melt-through" or "blow-through" is a particular problem. With this type of welding process, it is desirable to provide a means for limiting or confining the extent, size or depth of the molten pool of metal developed during the process.

The present invention provides a novel arrangement for so limiting and confining the extent, size and depth of the molten pool so as to substantially eliminate "melt-through" or "blow-through."

In order to accomplish the purposes of the present invention, fine particles of metallic substance are disposed adjacent the edges of two members to be welded together, and it has been found that in particular iron powder has the outstanding characteristic of providing a very efficient stopper or back-up material which effectively prevents any "melt-through" or "blow-through" in the joint during welding even though relatively high currents are employed and although the edges of the members may be relatively widely spaced from one another.

The utilization of fine particles of metallic substance as described above under many circumstances will be incorporated into the weld to a considerable degree. Accordingly, a powdered metal of the proper composition may be used to produce or control a desired chemical composition of the weld metal.

An object of the present invention is to provide a new and novel method and apparatus for fusion welding which permits control of the extent, size and depth of the molten pool developed during the welding process and which enables substantial elimination of "melt-through" or "blow-through" during such welding processes.

Another object of the invention is the provision of a novel method and apparatus for fusion welding which permits control of the chemical composition of the weld metal.

A further object of the invention is to provide a novel back-up means for use in fusion welding.

Other objects and many attendant advantages of the invention will become more apparent when considered in connection with the specification and accompanying drawings, wherein.

Figure 1:
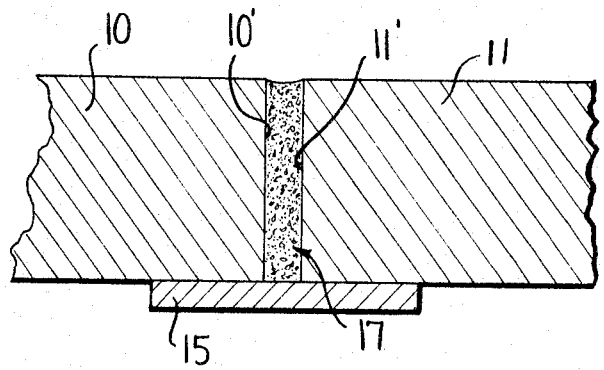
FIG. 1 is a sectional view illustrating a first form of the invention.

Referring now to the drawing, there is shown in FIG. 1 a pair of members or workpieces 10 and 11 which may for example be medium carbon steel plates 1½ inches thick having plane edges which are adapted to be butt-welded. The adjacent spaced edges of members 10 and 11 are indicated by reference numerals 10' and 11' respectively and define a gap therebetween which in the example shown may comprise approximately ¼ inch.

A suitable back-up means or support means is provided for holding the body of fine metallic particles in place within the gap, and this takes the form of a temporary steel strip 15 and the like which may be supported in operative position as shown by any conventional means such as tact welding or the like, this steel strip spanning the gap as shown and extending lengthwise of the gap between the plates.

The gap between the plates is substantially filled by a body 17 of fine particles of a metallic substance. This body preferably comprises powdered iron, although it will be realized that various other metallic substances may be employed as well as a mixture of different metallic substances or a metallic substance and a non-metallic substance.

As illustrated in this figure, the gap is substantially filled with the body 17, although it may in some instances be desired to only partially fill the gap.

The width of the gap as described above is selected so as to provide space for accommodating the molten metal deprived from the welding wire and the base plate melted by the specific current used for the particular thickness of plate. It is not necessary to remove or add to the body 17 which remains in the gap after the plates have been welded on one side and turned over for welding on the second side.

It will of course be understood with the arrangement as shown in FIG. 1 that welding will be carried out on the side of the members 10 and 11 opposite to that with which the back-up means 15 is associated.

With the arrangement as shown in FIG. 1, the weld may be executed using commercially well known submerged arc welding equipment. In carrying out this welding process, a conventional welding wire and welding composition may be employed with direct current, electrode positive, and two passes may be made, one on each side of the plates. In a typical example, the first pass may employ an amperage of 1200 amps, an arc voltage of 32 volts and a speed of 9" per minute. The second pass may also employ an amperage of 1200 amps, an arc voltage of 40 volts and a speed of 13" per minute.

Radiographic and chemical examinations and physical tests of a weld executed according to the above-described parameters indicates that the weld has properties equivalent to prevailing standards for the type of material and welding process employed.

The presence of iron powder in the gap has an impressive and outstanding characteristic in effectively preventing any "melt-through" or "blow-through."

Figure 2:
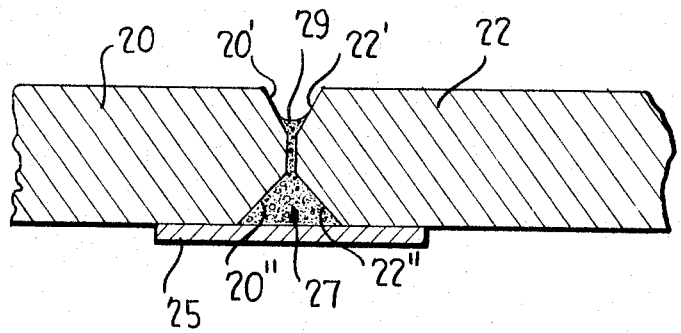
FIG. 2 is a sectional view illustrating a second form of the invention.

Referring now to FIG. 2, a pair of carbon steel plates or similar members 20 and 22 are provided to be welded together along the edges thereof. These plates may be for example 1" in thickness, plate 20 having beveled edges 20' and 20" formed thereon, and plate 22 having beveled edges 22′ and 22″ formed thereon.

It will be noted that the plates are disposed with the adjacent faces thereof spaced slightly apart. A back-up plate 25 in the form of a temporary steel strip or the like is suitably secured in position at one side of members 20 and 22 for the same purpose as member 15 described in connection with FIG. 1.

The gap between the adjacent spaced edges of members 20 and 22 is filled with fine particles of metallic substance, preferably powdered iron, the body of material being indicated by reference numeral 27 and being filled to the level of the line indicated by reference numeral 29.

The iron powder is introduced from the top side of the gap between the members 20 and 22 as seen in FIG. 2 and care should be taken to see that the powder substantially fills the bottom groove portion defined between the upper surface of member 25 and the beveled edge portions 20″ and 22″.

In carrying out this particular welding process, alternating current may be used to make the weld. It has been found that with this type of an arrangement, sound welds are obtained with freedom from "melt-through," even though the current may at times increase to well above normal.

In carrying out the welding process with the arrangement shown in FIG. 2, it is not necessary to remove or add any material to the body 27 after turning over the members 20 and 22 to weld the second side, it being understood that the initial pass will serve to weld the members together from the upper side thereof as seen in FIG. 2.

The joint preparation may involve the provision of plane edges or fully or partially beveled edges with the bevel on one or both sides of the members to be welded, or the edges may be contoured as desired.

The gap between the adjacent edges of the members to be welded may be varied as desired in order to produce the best appearing weld, or to increase or decrease the admixture of melted powder into the weld.

It is also apparent that the body of material disposed in the gap may substantially fill the gap or may only partially fill the gap as illustrated in FIG. 2.

Figure 3:
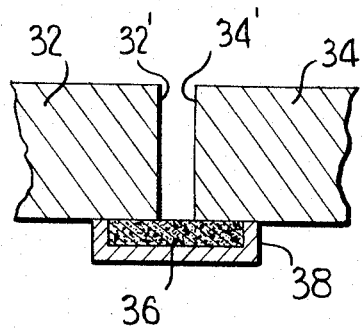
FIG. 3 is a sectional view illustrating a still further form of the invention.

Referring now to FIG. 3, a further form of the invention is illustrated wherein a pair of members or plates 32 and 34 are adapted to be welded together, these plates being provided with facing plane spaced edges 32′ and 34′ respectively which define a gap therebetween.

A back-up means 36 comprises a relatively rigid molded body formed of fine particles of metallic substance such as powdered iron which are held together by a binding agent of inorganic nature such as sodium silicate or potassium silicate. The powdered metallic substance may also be molded by pressure with or without heat in order to form the back-up means 36.

It should be understood that any suitable means may be provided for maintaining the back-up means 36 in the operative position shown. For example, a clamping block 38 may be employed which may be formed of steel or the like and which has a groove extending longitudinally thereof for receiving the back-up means 36. It is apparent that member 38 may be clamped in operative position by any conventional means.

Figure 4:
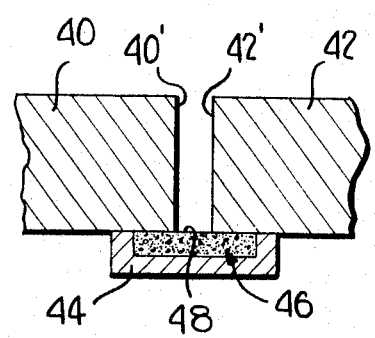
FIG. 4 is a sectional view illustrating yet another modification of the present invention.

Referring now to FIG. 4, a further form of the invention is illustrated wherein a pair of members or plate 40 and 42 are provided having facing spaced plane edges 40′ and 42′ respectively.

A support means 44 or trough having a longitudinally extending groove formed in the upper surface thereof is adapted to be supported adjacent the gap and in spanning relationship thereto as shown in FIG. 4 as is the member 38 as shown in FIG. 3. The trough member 44 is adapted to support within the longitudinally extending groove thereof a body 46 of fine particles of metallic substance such as powdered iron.

In each of the modifications shown in FIGS. 3 and 4, it will be understood that the fine particles of metallic substance serve to provide the desired objectives as the molding process is carried out as described previously herein.

Under certain circumstances, the molten pool of metal may not reach the powdered metal at all when the powdered metal is used simply as a safeguard against such contingencies such as "melt-through." Under such conditions, the powdered metal may not enter into the weld at all.

Under many circumstances, it is certain that a considerable portion of the powdered metal will definitely be incorporated into the weld. Therefore, powdered metal of the proper composition may be used to produce or control a desired chemical composition of the weld metal. In any case, it is necessary to ensure that the powdered metal does not adversely affect the chemical composition of the weld.

The current utilized in electric welding processes according to the present invention may be alternating or direct, either polarity. Single or multiple electrodes may be used.

The welding composition of fluxes used for submerged arc welding may be any of those commercially available or which can be purchased as a special order. Welding wires used may be any that are found suitable for a particular application.

The principal welding processes employed may be submerged arc, or any electric welding or further any fusion process wherein the powdered metal serves the intended function.

The powdered metal employed may be of any composition, mixture or particle size depending on the particular work and the powdered metal may be mixed with non-metallic substances in certain instances.

Either single or multiple pass welding may be employed according to the present invention.

It is apparent from the foregoing that there is provided according to the present invention a new and novel method and apparatus for fusion welding two members along the edges thereof. The arrangement of the present invention permits control of the extent, size or depth of molten pool developed during the welding process and substantially prevents "melt-through" or "blow-through" during welding. The present invention also permits control of the chemical composition of the weld metal. A novel back-up means is also provided by the present invention and in particular in the form of a relatively rigid body of fine particles of a metallic substance which may be in combination with an inorganic binder.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:
1. The method of fusion welding two members along the edges thereof comprising positioning the edges of the members in closely spaced relationship to one another to provide a gap therebetween, positioning a back-up means at one side of said members extending along said gap, at least partially filling said gap with only powdered metal which is supported on said back-up means, and then welding said members to one another, along said edges from the opposite side of said members, the two members having inner and outer surfaces, and the edges of the members being oppositely similarly beveled inwardly from the said inner surfaces and such beveled edges terminating substantially medially of each member, and in- wardly of the said beveled edges the edges of the members being substantially parallel and these parallel edges terminating in similarly oppositely disposed bevels on each of the said edges to the said outer surfaces.

2. The method as defined in and by claim 1 wherein the beveled edges extending inwardly of said inner surfaces are of less cross-sectional dimensions than the said beveled edges extending to the said outer surfaces from the parallel edges.

References Cited by the Examiner

UNITED STATES PATENTS

| | | | |
|---|---|---|---|
| 2,145,009 | 1/1939 | Keir | 219—73 |
| 2,331,689 | 10/1943 | Hodge | 219—160 |
| 2,927,990 | 3/1960 | Johnson | 219—73 |
| 3,253,121 | 5/1966 | Robbins | 219—137 |

RICHARD M. WOOD, *Primary Examiner.*